United States Patent
Hanaichi et al.

(10) Patent No.: US 7,569,263 B2
(45) Date of Patent: Aug. 4, 2009

(54) PACKING BAG STRUCTURE

(75) Inventors: Takashi Hanaichi, Nagoya (JP); Ken Nishizawa, Nagano (JP); Yoshiki Kato, Nabari (JP)

(73) Assignee: Hokuto Co., Ltd., Nagano-Shi (JP)

( * ) Notice: Subject to any disclaimer, the term of this patent is extended or adjusted under 35 U.S.C. 154(b) by 507 days.

(21) Appl. No.: 10/944,410

(22) Filed: Sep. 20, 2004

(65) Prior Publication Data

US 2006/0062949 A1    Mar. 23, 2006

(51) Int. Cl.
- B32B 1/08 (2006.01)
- B32B 27/08 (2006.01)
- B29D 22/00 (2006.01)
- B29D 23/00 (2006.01)

(52) U.S. Cl. ............... 428/35.4; 428/35.2; 428/35.7; 428/36.6; 428/220; 383/102; 383/113

(58) Field of Classification Search ............... 428/35.2, 428/35.4, 35.7, 36.6, 220; 383/102, 109, 383/110, 113
See application file for complete search history.

(56) References Cited

U.S. PATENT DOCUMENTS 6,550,966 B1 *  4/2003  Saad et al. ................. 383/103
2003/0198764 A1 * 10/2003  Kendig ..................... 428/34.9

FOREIGN PATENT DOCUMENTS

| JP | 49-38681 | 4/1974 |
| JP | 6-56170 | 3/1994 |
| JP | 2002-1875 | 1/2002 |
| JP | 2002-194324 | 7/2002 |
| WO | WO 00/63092 | 10/2000 |

* cited by examiner

*Primary Examiner*—Michael C Miggins
(74) *Attorney, Agent, or Firm*—Kratz, Quintos & Hanson, LLP

(57) ABSTRACT

A packing bag structure formed of inner and outer bag members made of synthetic resin inner and outer films having different moisture permeabilities enables easy-to-dry moist foods or other perishable products to be packed in a suitable state and stored in a non-soggy and untarnished condition. The inner film has moisture permeability of 9 to 200 g/($m^2$·24 h), preferably 20 to 30 g/($m^2$·24 h), and the outer film has moisture permeability of 4 to 15 g/($m^2$·24 h), preferably 7 to 10 g/($m^2$·24 h). The packing bag is produced by folding a long film sheet formed of the inner and outer films into two, having an article such as food placed between the twofold film sheet, thermally sealing the film sheet by using an end sealer and cutting off the packed and sealed portion.

2 Claims, 2 Drawing Sheets

PACKING BAG STRUCTURE

BACKGROUND OF THE INVENTION

1. Field of the Invention

This invention relates to a packing bag, and more particularly to a double bag structure for packing easy-to-dry moist foods or perishable products.

2. Description of the Related Art

As a packing bag for packing easy-to-dry moist articles or perishable foods, such as fungi including *Grifola frondosa* and *Shimeji* (brown button mushrooms), agricultural products such as lettuce, spinach, bean sprouts, fish and seafood, meat and livestock products, there have been extensively used plastic bags made of film of polystyrene, polyethylene polypropylene or the like, which are easy to use, make a fine show and can preserve the freshness of moist foods and suchlike.

Plastic bags used as the packing bag are different in flexibility, ductility, toughness and moisture permeability (moisture permeability) according to the material and thickness thereof. A plastic bag having high moisture permeability could well cause an easy-to-dry moist product such as vegetables to be wilted or parched. On the contrary, a plastic bag having low moisture permeability prevents the moist product from being dried, but entails a disadvantage of forming dew condensation in the bag to mist up the inside of the bag and drench the product in the bag with moisture.

Generally, the plastic bags made of polypropylene film, which have been in heavy usage for packing perishable foods, are sturdy and good moisture retention to prevent the foods from wilting, but suffer from the disadvantage of forming dew in the bag, which gives a foggy appearance of the bag and makes the product in the bag unattractive.

In order to prevent the formation of dew condensation in the bag, breathing holes are sometimes pierced in the polypropylene bag. However, where the breathing holes are made large (e.g. 5 mm in diameter), there is a possibility that an insect or other foreign body may enter the bag through the breathing holes. Conversely, where the breathing holes are made small (e.g. 50 to 100 μm in diameter), they are inconveniently plugged and become ineffective.

SUMMARY OF THE INVENTION

In view of the foregoing disadvantages inherent in the known types of packing bags now present in the prior art, the present invention has an object to provide a useful bag for effectively packing easy-to-dry moist articles or products. Another object of the present invention is to provide a packing bag structure capable of suppressing dew condensation from forming inside the bag and making the inside of the bag soggy so as to retain moisture content of the moist article or product packed in the bag.

To attain the objects described above according to the present invention, there is provided a packing bag structure comprising an inner bag member made of an inner film of synthetic resin, and an outer bag member made of an outer film of synthetic resin and provided outside to cover the inner bag member. The inner film has moisture permeability of 9 to 200 g/(m$^2$·24h), and the outer film has moisture permeability of 4 to 15 g/(m$^2$·24h). The inner and outer films have their end parts thermally welded together to form the inner and outer bags each spaced apart with an air layer.

It may be practical to use the inner film having moisture permeability of 20 to 30 g/(m$^2$·24 h), and the outer film having moisture permeability of 7 to 10 g/(m$^2$·24 h).

At least one of the inner and outer films may have the inner surface coated with 0.1 to 5% by weight of anticlouding agent in aggregate.

The aforementioned and other objects and advantages of the invention will become more apparent from the following detailed description of particular embodiments of the Invention taken in conjunction with the accompanying drawings.

DESCRIPTION OF THE PREFERRED EMBODIMENTS OF THE INVENTION

Preferred embodiments of a packing bag structure in accordance with the present invention will be described in detail with reference to the accompanying drawings.

Figure 1:
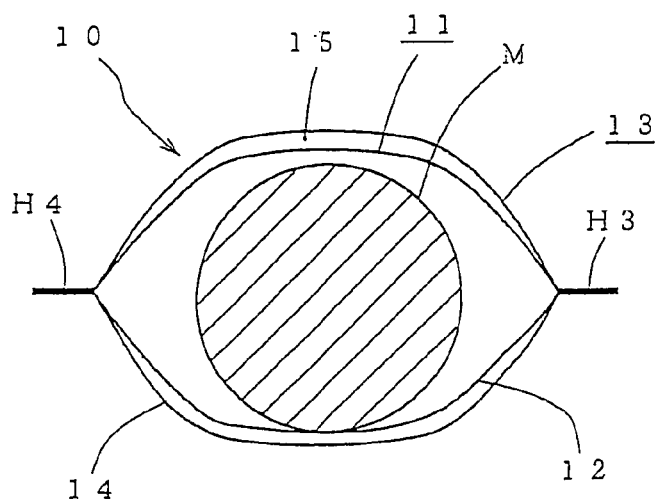
FIG. 1 is a sectional view showing one embodiment of a packing bag structure according to the present invention.

The packing bag structure shown in FIG. 1 as one embodiment of the invention comprises a packing bag 10 for packing an easy-to-dry moist article (packing object M), i.e. perishable food such as *Grifola frondosa* commonly called "MAITAKE" in this embodiment The packing bag 10 comprises an inner bag member 11 made of an inner film 12 of synthetic resin, and an outer bag member 13, which is provided outside to cover the inner bag member 11 and made of an outer film 14 of synthetic resin. The inner film 12 forming the inner bag member 11 has moisture permeability of 9 to 200 g/(m$^2$·24 h), and the outer film 14 has moisture permeability of 4 to 15 g/(m$^2$·24 h). The moisture permeability prescribed by JIS K 7129 is adopted herein.

The inner film 12 and the outer film 13 have their end parts H3 and H4 thermally welded together to form the inner and outer bag members 11 and 13 each spaced apart with an air layer 15.

The packing bag structure thus provided permits water content to evaporate from the packed object M and transpire through the inner bag member 11 of the inner film 12 having moisture permeability of 9 to 200 g/(m$^2$·24 h), consequently to prevent dew condensation on the inner surface of the inner bag member 11. The outer bag member 13, which is formed of the outer film 14 having the relatively low moisture permeability of 4 to 15 g/(m$^2$·24 h) as compared with that of the inner film 12, prevents the moisture from evaporating and penetrating to the outside, resulting in increasing humidity in the bag 10. Consequently, the water content in the bag becomes hard to evaporate, thus preventing the object M packed in the bag to be dried or wilted. Due to the air layer formed between the inner and outer bag members 11 and 13, lowering of temperature in the bag is moderated even if the ambient temperature is changed, consequently to suppress dew condensation in the bag to a low level.

It is preferable that the inner film 12 is made of material capable of being sealed thermally, such as polypropylene, polystyrene, polyethylene, polyester or laminated sheet thereof, and has moisture permeability of 9 to 200 g/(m$^2$·24 h) and a thickness of 10 to 60 microns. To the material of the inner film 12, there may be added common chemical admixture, filler, lubricant and/or anti-block agent.

Similarly to the inner film 12 described above, it is preferable that the outer film 14 is made of material capable of being sealed thermally, such as polypropylene, polystyrene, polyethylene, polyester or laminated sheet thereof, and has moisture permeability of 5 to 15 g/(m$^2$·24 h) and a thickness of 10 to 100 microns. Also to the material of the outer film 14, there may be added common chemical admixture, filler, lubricant and/or anti-block agent Although it is desirable to make the inner and outer films 12 and 14 of the same kind of material, they may of course be made of different kinds of materials.

As another preferred embodiment of the invention, the moisture permeability of the inner film 12 may be defined to the range from 20 to 30 g/(m$^2$·24 h), and that of the outer film 14 may be defined to the range from 7 to 10 g/(m$^2$·24 h).

In still another preferred embodiment of the invention, at least one of the inner and outer films may have the inner surface coated with 0.1 to 5% by weight of anticlouding agent in aggregate. As examples of the anticlouding agent, there may be used higher fatty acid amines, higher fatty acid amides, ethylene oxide adducts of fatty acid amines or fatty acid amides, fatty acid esters with polyhydric alcohol and so forth. As the anticlouding agent as described later, there may be used a mixture of glycerine fatty acid ester and higher fatty acid amine (1:1). The anticlouding agent has not only a dripproof function but also an antistatic function. Thus, it is desirable to use the anticlouding agent in processing the packing bag and packing moist objects or foods with the packing bag. Incidentally, 0.1% or less by weight of anticlouding agent has little effect, but on the contrary, where the anticlouding agent in the film is increased to 5% or more by weight, the inside of the bag becomes soggy and possibly defaces the bag.

The manner of using the packing bag in packing the object M such as food according to the invention is not specifically limited. That is, the object May be directly be packed or wrapped with the packing bag, or otherwise, it may be packed using a disposable tray or the like in the customary way. The manner of sealing strip-like packing films in the longitudinal direction to pack an object into the shape like a pillow will be described below with reference to FIG. 2 through FIG. 6 as one example.

Figure 2:
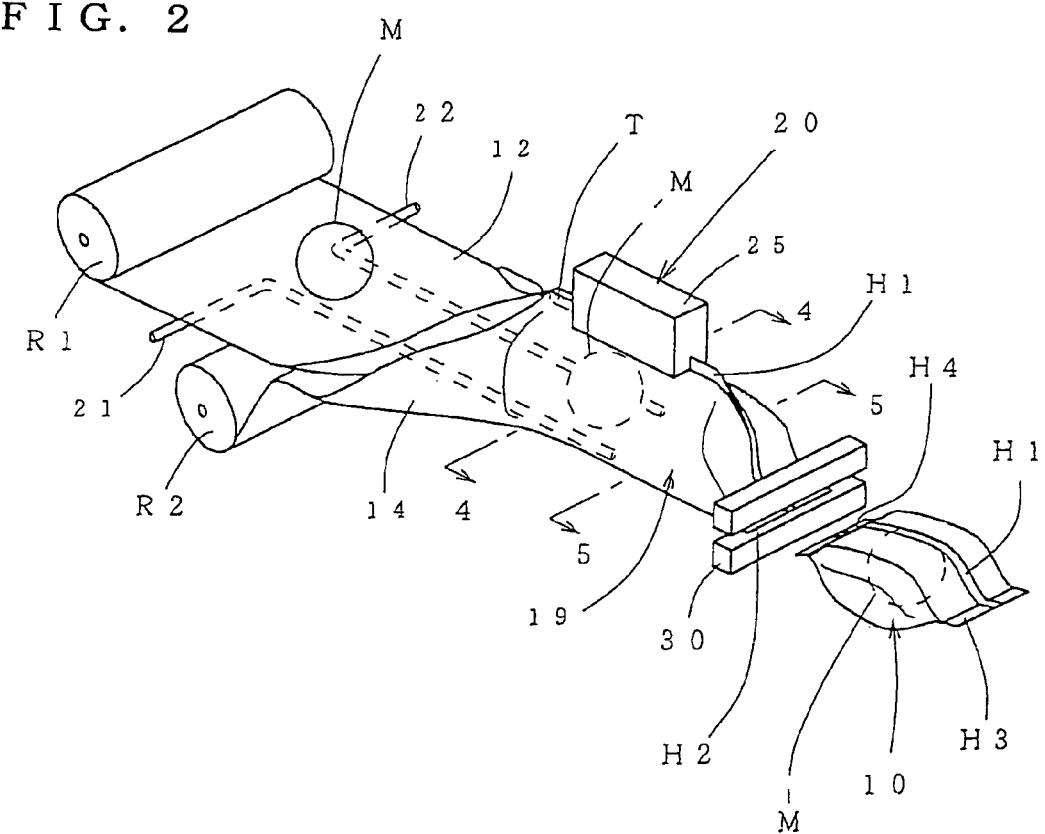
FIG. 2 is a perspective view showing an example of a packing process using the packing bag of the invention

FIG. 2 illustrates the process of packing the object M with the so-called longitudinal pillow packaging machine 20, using the packing system including the packing bag structure according to the present invention. With the illustrated longitudinal pillow packaging machine 20, the object M is packed with the packing bag structure of the invention in the following manner. First of all, two kinds of films having different moisture permeabilities are prepared. One of the prepared films is used as the inner film 12 having relatively high moisture permeability, and the other is used as the outer film 14 having relatively low moisture permeability. Denoted by R1 and R2 are rolls of the inner and outer films.

In the first process, the packing object M is placed on the inner film 12 fed from the film roll R1 onto a belt conveyor (not shown) so as to be positioned substantially at the central portion of the width direction of the inner film 12. The packing object M placed on the inner film 12 is sent to a second process as the inner film moves forward.

Figure 4:
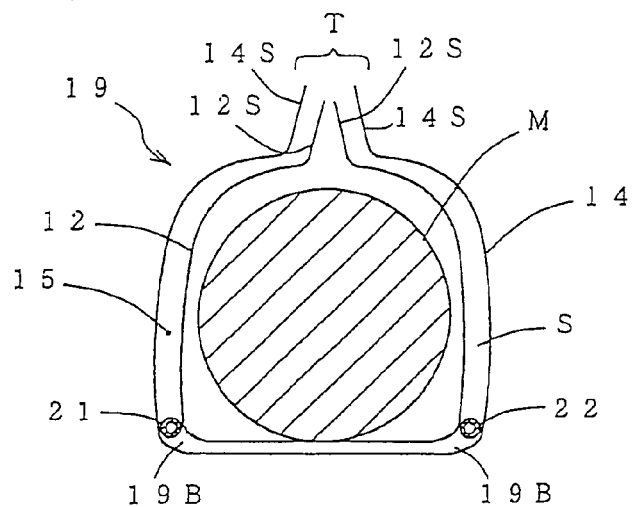
FIG. 4 is a sectional view taken along line 4-4 in FIG. 2.

In the second process, the inner film 12 on which the packing object M is placed overlaps the outer film 14 fed from the film roll R2. On the both sides of the inside film 12 and the outer film 14, there are mounted air injectors 21 and 22 for blowing air into between the inner and outer films 12 and 14 to form an air space S and an air layer 15 between the films, as shown in FIGS. 2 and 4.

Figure 3:
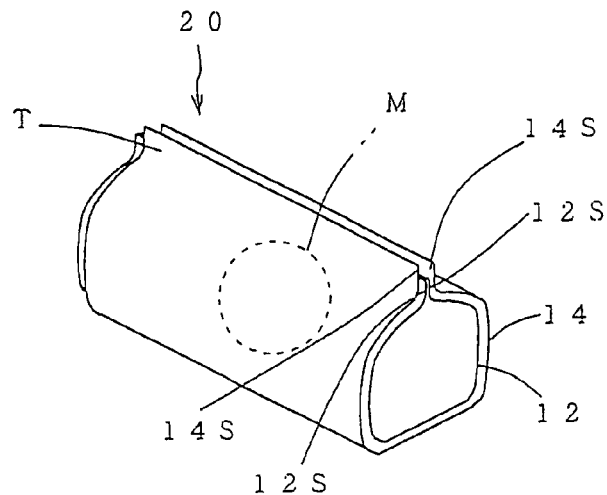
FIG. 3 is a perspective view showing in part the state in which a film is formed into a tube in the packing process of FIG. 2.

In the third process, the packing object M is wrapped with the overlapped inner and outer films 12 and 14 in the form of a tube as shown in FIG. 3, to make up a tube-like bag entity 19. As can be expected from FIG. 4, the tube-like bag entity 19 has the inner and outer films 12 and 14 overlapped through the air space S and the side hem portions 12S and 14S of the films 12 and 14 uplifted and bonded together to form lap parts T. Between the inner and outer films 12 and 14, there are disposed air outlet nozzles 21 and 22 at bent portions 19B of the bottom of the bag entity 19, so as to allow air in the space S formed between the inner and outer films 12 and 14 to be intermittently discharged through the air outlet nozzles 21 and 22, thus to assure the air layer 15 between the inner and outer films 12 and 14.

Figure 5:
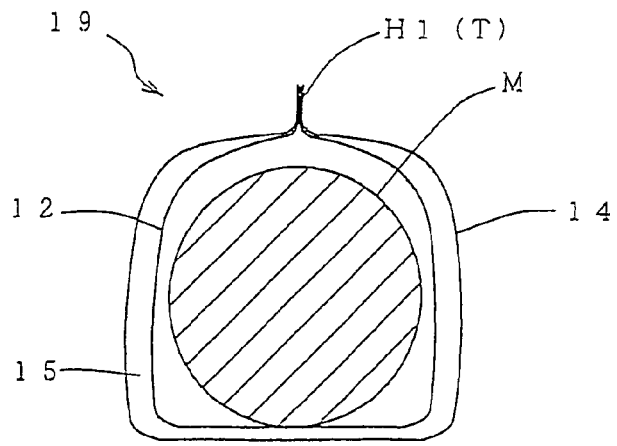
FIG. 5 is a sectional view taken along line 5-5 in FIG. 2.

In the fourth process, the lap parts T of the side hem portions 12S and 14S of the inner film 12 and outer film 14 are thermally welded with a thermal sealer 25 to form a seam tab H1 as shown in the sectional view of FIG. 5.

Next in the fifth process, the bag entity 19 wrapping the object M is cut off to a prescribed length and then sealed crosswise with an end sealer 30. The sealed part of the bag entity 19 is cut in the middle by the end sealer 30 to simultaneously form a tail end H4 of a preceding bag entity and a leading end H2 of a following bag entity to be processed next.

Through the repetition of the foregoing processes, which comprises thermally sealing the inner and outer films 12 and 14 having different moisture permeabilities so as to form the inner and outer bag members 11 and 13 between which the air layer 15 is formed, the intended packing bags 10 as shown in FIG. 1 can be continuously produced. In the sectional view of FIG. 1, the seam tab H1 of the side hem portions 12S and 14S of the inner and outer films 12 and 14 are not shown.

Next, the inner film 12 and the outer film 14 of the packing bag 10 of the invention will be explained in more concrete terms. As the packing object M to be packed with the packing bag according to the embodiment described below, a 100-gram MAITAKE mushroom (*Grifola frondosa*), which has a high water content and is easy to dry, was used in experimental comparative tests. Also, various types of the inner and outer films 12 and 14 having different moisture permeabilities as indicated by comparative test results as described later were used in combination so as to pack the packing object M in accordance with the aforementioned processes. Measurement of the moisture permeability of each of the inner and outer films 12 and 14 used in the comparative tests was carried in accordance with a B-method (infrared sensor method) of a testing method for water vapor transmission rate of plastic film and sheet and sheeting compliant with JIS K 7129-1992 as mentioned above.

In the comparative tests, biaxially oriented polypropylene films containing anticlouding agents having different moisture permeabilities were used and named Films #1 to #6 in the tests. The Film #1 is a polypropylene film having moisture permeability of 5.3 g/(m$^2$·24 h) and a thickness of 40 μm, the Film #2 is a polypropylene film having moisture permeability of 6.0 g/(m$^2$·24 h) and a thickness of 30 μm, the Film #3 is a polypropylene film having moisture permeability of 6.8 g/(m$^2$·24 h) and a thickness of 25 μm, the Film #4 is a polypropylene film having moisture permeability of 7.9 g/(m$^2$·24 h) and a thickness of 20 μm, the Film #5 is a polypropylene film having moisture permeability of 9.2 g/(m$^2$·24 h) and a thickness of 15 μm, and the Film #6 is a polypropylene film having moisture permeability of 24.3 g/(m$^2$·24 h) and a thickness of 15 μm. Each of the films used in the comparative tests contains 1.2% by weight of the anticlouding agent. Each film is heat-sealing on both sides.

Furthermore, there were used Film #7, which is a polystyrene film having moisture permeability of 186 g/(m²·24 h) and a thickness of 15 μm and Film #8, which is a polyester film having moisture permeability of 50 g/(m²·24 h) and a thickness of 12 μm as the inner film. The Films #7 and #8 used as the inner film in the tests were overcoated with the heat-sealing agent tradenamed "AQUA SEAL 1700W" (made by Toyo Ink Mfg. Co., Ltd.) so as to be thermally sealed.

TABLE 1

|  |  | Outer Film | | Inner Film | | Apparent Moisture Permeability | Proportion in Moisture Permeability (Inner Film to Outer Film) |
|---|---|---|---|---|---|---|---|
|  |  | No. | Permeability | No. | Permeability | | |
| Subject Example | #1 | 1 | 5.3 | 6 | 24.3 | 4.35 | 4.58 |
|  | #2 | 2 | 6.0 | 6 | 24.3 | 4.81 | 4.05 |
|  | #3 | 3 | 6.8 | 6 | 24.3 | 5.31 | 3.57 |
|  | #4 | 4 | 7.9 | 6 | 24.3 | 5.96 | 3.08 |
|  | #5 | 5 | 9.2 | 6 | 24.3 | 6.67 | 2.64 |
|  | #6 | 1 | 5.3 | 5 | 9.2 | 3.36 | 1.74 |
|  | #7 | 2 | 6.0 | 5 | 9.2 | 3.63 | 1.53 |
|  | #8 | 3 | 6.8 | 5 | 9.2 | 3.91 | 1.35 |
|  | #9 | 4 | 7.9 | 5 | 9.2 | 4.25 | 1.16 |
|  | #10 | 5 | 9.2 | 7 | 186.0 | 8.77 | 20.22 |
|  | #11 | 4 | 7.9 | 8 | 50.0 | 6.82 | 6.33 |
| Comparative Example | #1 | 1 | 5.3 | 1 | 5.3 | 2.65 | 1.00 |
|  | #2 | 2 | 6.0 | 2 | 6.0 | 3.00 | 1.00 |
|  | #3 | 3 | 6.8 | 3 | 6.8 | 3.40 | 1.00 |
|  | #4 | 4 | 7.9 | 4 | 7.9 | 3.95 | 1.00 |
|  | #5 | 5 | 9.2 | 5 | 9.2 | 4.60 | 1.00 |
|  | #6 | 6 | 24.3 | 6 | 24.3 | 12.15 | 1.00 |
|  | #7 | 6 | 24.3 | 3 | 6.8 | 5.31 | 0.28 |
|  | #8 | 6 | 24.3 | 4 | 7.9 | 5.96 | 0.33 |
|  | #9 | 6 | 24.3 | 5 | 9.2 | 6.67 | 0.38 |
|  | #10 | 1 | 5.3 | — | — | 5.30 | — |
|  | #11 | 2 | 6.0 | — | — | 6.00 | — |
|  | #12 | 3 | 6.8 | — | — | 6.80 | — |
|  | #13 | 4 | 7.9 | — | — | 7.90 | — |
|  | #14 | 5 | 9.2 | — | — | 9.20 | — |
|  | #15 | 6 | 24.3 | — | — | 24.30 | — |

SUBJECT EXAMPLE 1

A packing bag in the first experimental example was formed by using the Film #1 as the outer film and the Film 6 as the inner film. The packing bag in this example, having apparent moisture permeability of 4.35 g/(m²·24 h). The proportion in moisture permeability of the inner film to the outer film is 4.58.

SUBJECT EXAMPLE 2

A packing bag in this experimental example was formed by using the Film #2 as the outer film and the Film 6 as the inner film. The packing bag in this example, having apparent moisture permeability of 4.81 g/(m²·24 h). The proportion in moisture permeability of the inner film to the outer film is 4.05.

SUBJECT EXAMPLE 3

A packing bag in this experimental example was formed by using the Film #3 as the outer film and the Film 6 as the inner film. The packing bag in this example, having apparent moisture permeability of 5.31 g/(m²·24 h). The proportion in moisture permeability of the inner film to the outer film is 3.57.

SUBJECT EXAMPLE 4

A packing bag in this experimental example was formed by using the Film #4 as the outer film and the Film 6 as the inner film. The packing bag in this example, having apparent moisture permeability of 5.96 g/(m²·24 h). The proportion in moisture permeability of the inner film to the outer film is 3.08.

SUBJECT EXAMPLE 5

A packing bag in this experimental example was formed by using the Film #5 as the outer film and the Film 6 as the inner film. The packing bag in this example, having apparent moisture permeability of 6.67 g/(m²·24 h). The proportion in moisture permeability of the inner film to the outer film is 2.64.

SUBJECT EXAMPLE 6

A packing bag in this experimental example was formed by using the Film #1 as the outer film and the Film 5 as the inner film. The packing bag in this example, having apparent moisture permeability of 3.36 g/(m²·24 h). The proportion in moisture permeability of the inner film to the outer film is 1.74.

SUBJECT EXAMPLE 7

A packing bag in this experimental example was formed by using the Film #2 as the outer film and the Film 5 as the inner film. The packing bag in this example, having apparent moisture permeability of 3.63 g/(m²·24 h). The proportion in moisture permeability of the inner film to the outer film is 1.74.

SUBJECT EXAMPLE 8

A packing bag in this experimental example was formed by using the Film #3 as the outer film and the Film 5 as the inner film. The packing bag in this example, having apparent moisture permeability of 3.91 g/(m²·24 h). The proportion in moisture permeability of the inner film to the outer film is 1.35.

SUBJECT EXAMPLE 9

A packing bag in this experimental example was formed by using the Film #4 as the outer film and the Film 5 as the inner film. The packing bag in this example, having apparent moisture permeability of 4.25 g/(m²·24 h). The proportion in moisture permeability of the inner film to the outer film is 1.16.

SUBJECT EXAMPLE 10

A packing bag in this experimental example was formed by using the Film #5 as the outer film and the Film 7 as the inner film. The packing bag in this example, having apparent moisture permeability of 8.77 g/(m²·24 h). The proportion in moisture permeability of the inner film to the outer film is 20.22.

SUBJECT EXAMPLE 11

A packing bag in this experimental example was formed by using the Film #4 as the outer film and the Film 8 as the inner film. The packing bag in this example, having apparent moisture permeability of 6.82 g/(m²·24 h). The proportion in moisture permeability of the inner film to the outer film is 6.33.

COMPARATIVE EXAMPLE 1

A packing bag in this comparative example was formed by using the Film #1 as the inner and outer films having the same moisture permeability. The packing bag in this comparative example, having apparent moisture permeability of 2.65 g/(m²·24 h). The proportion in moisture permeability of the inner film to the outer film is 1.00.

COMPARATIVE EXAMPLE 2

A packing bag in this comparative example was formed by using two sheets of Film #2 as the inner and outer films having the same moisture permeability. The packing bag in this comparative example, having apparent moisture permeability of 3.00 g/(m²·24 h). The proportion in moisture permeability of the inner film to the outer film is 1.00.

COMPARATIVE EXAMPLE 3

A packing bag in this comparative example was formed by using two sheets of Film #3 as the inner and outer films having the same moisture permeability. The packing bag in this comparative example, having apparent moisture permeability of 3.40 g/(m²·24 h). The proportion in moisture permeability of the inner film to the outer film is 1.00.

COMPARATIVE EXAMPLE 4

A packing bag in this comparative example was formed by using two sheets of Film #4 as the inner and outer films having the same moisture permeability. The packing bag in this comparative example, having apparent moisture permeability of 3.95 g/(m²·24 h). The proportion in moisture permeability of the inner film to the outer film is 1.00.

COMPARATIVE EXAMPLE 5

A packing bag in this comparative example was formed by using two sheets of Film #5 as the inner and outer films having the same moisture permeability. The packing bag in this comparative example, having apparent moisture permeability of 4.60 g/(m²·24 h). The proportion in moisture permeability of the inner film to the outer film is 1.00.

COMPARATIVE EXAMPLE 6

A packing bag in this comparative example was formed by using two sheets of Film #6 as the inner and outer films having the same moisture permeability. The packing bag in this comparative example, having apparent moisture permeability of 12.15 g/(m²·24 h). The proportion in moisture permeability of the inner film to the outer film is 1.00.

COMPARATIVE EXAMPLE 7

A packing bag in this comparative example was formed by using two sheets of Film #7 as the inner and outer films having the same moisture permeability. The packing bag in this comparative example, having apparent moisture permeability of 5.31 g/(m²·24 h). The proportion in moisture permeability of the inner film to the outer film is 0.28.

COMPARATIVE EXAMPLE 8

A packing bag in this comparative example was formed by using two sheets of Film #8 as the inner and outer films having the same moisture permeability. The packing bag in this comparative example, having apparent moisture permeability of 5.96 g/(m²·24 h). The proportion in moisture permeability of the inner film to the outer film is 0.33.

COMPARATIVE EXAMPLE 9

A packing bag in this comparative example was formed by using two sheets of Film #9 as the inner and outer films having the same moisture permeability. The packing bag in this comparative example, having apparent moisture permeability of 6.67 g/(m²·24 h). The proportion in moisture permeability of the inner film to the outer film is 0.38.

COMPARATIVE EXAMPLE 10

A packing bag in this comparative example was formed of a single sheet of Film #1. The packing bag in this comparative example, having apparent moisture permeability of 5.30 g/(m²·24 h).

COMPARATIVE EXAMPLE 11

A packing bag in this comparative example was formed by using a single sheet of Film #2. The packing bag in this comparative example, having apparent moisture permeability of 6.00 g/(m²·24 h).

COMPARATIVE EXAMPLE 12

A packing bag in this comparative example was formed by using a single sheet of Film #3. The packing bag in this comparative example, having apparent moisture permeability of 6.80 g/(m²·24 h).

COMPARATIVE EXAMPLE 13

A packing bag in this comparative example was formed by using a single sheet of Film #4. The packing bag in this comparative example, having apparent moisture permeability of 7.90 g/(m²·24 h).

COMPARATIVE EXAMPLE 14

A packing bag in this comparative example was formed by using a single sheet of Film #4. The packing bag in this comparative example, having apparent moisture permeability of 9.20 g/(m²·24 h).

COMPARATIVE EXAMPLE 15

A packing bag in this comparative example was formed by using a single sheet of Film #6. The packing bag in this comparative example, having apparent moisture permeability of 24.30 g/(m²·24 h).

Evaluations of dew condensation, weight of dew condensed inside the bag, wilting of the packed object, rate of temperature change of the packing bags of the subject examples and comparative examples described above were conducted. The evaluation results thereof are shown below.

+++ ... Dew condensation posing a significant problem was observed over all.

Evaluation of Weight of Dew Condensation Water

After allowing the MAITAKE mushroom (packing object M) to be stored in each of the aforementioned packing bags at a temperature of 10° C. or less for 15 days and left for 1 hour at 23° C. at a relative humidity of 50% RH, the weight (amount) of dew condensed inside the bag was observed visually and evaluated by the following standards.

A ... Less than 0.25 grams
B ... 0.25 grams to 0.30 grams
C ... 0.30 grams to 0.35 grams
D ... 0.35 grams to 0.45 grams
E ... Over 0.45 grams

Evaluation of Wilting of Packed Object

After storing the MAITAKE mushroom (packing object M) in each of the aforementioned packing bags at a temperature of 10° C. or less for 15 days, the state of wilting of the packed object in the bag was observed visually and evaluated by the following standards.

TABLE 2

|  |  | Dew Condensation Evaluation | Weight of Dew Condensation Water | Evaluation of Wilting | Rate of Temperature Change |
|---|---|---|---|---|---|
| Subject Example | #1 | ± | C | Excellent | 0.22 |
|  | #2 | −± | B | Excellent | 0.24 |
|  | #3 | −± | A | Excellent | 0.30 |
|  | #4 | ± | A | Excellent | 0.32 |
|  | #5 | ± | A | Excellent | 0.36 |
|  | #6 | ±+ | C | Excellent | 0.20 |
|  | #7 | + | C | Excellent | 0.21 |
|  | #8 | + | C | Excellent | 0.22 |
|  | #9 | + | B | Excellent | 0.22 |
|  | #10 | ± | A | Excellent | 0.21 |
|  | #11 | ±+ | B | Excellent | 0.24 |
| Comparative Example | #1 | +++ | E | Excellent | 0.18 |
|  | #2 | +++ | E | Excellent | 0.19 |
|  | #3 | +++ | E | Excellent | 0.21 |
|  | #4 | +++ | E | Excellent | 0.23 |
|  | #5 | ++ | D | Excellent | 0.25 |
|  | #6 | ± | C | Good | 0.68 |
|  | #7 | +++ | E | Excellent | 0.30 |
|  | #8 | +++ | E | Excellent | 0.33 |
|  | #9 | ++ | D | Excellent | 0.35 |
|  | #10 | +++ | E | Excellent | 0.53 |
|  | #11 | +++ | E | Excellent | 0.59 |
|  | #12 | +++ | E | Excellent | 0.68 |
|  | #13 | +++ | E | Excellent | 0.70 |
|  | #14 | ++ | D | Good | 0.88 |
|  | #15 | −± | A | Bad | 1.10 |

Dew Condensation Evaluation

After allowing the MAITAKE mushroom (packing object M) to be stored in each of the aforementioned packing bags under test at a temperature of 10° C. or less for 15 days and left for 1 hour at 23° C. at a relative humidity of 50% RH, the condition of the dew condensation inside the bag was observed visually and evaluated by the following standards.

− ... Little dew condensation was observed.
± ... Slight dew condensation was observed.
+ ... Dew condensation was observed in spots.
++ ... Dew condensation was observed over all.

Excellent ... Object was kept fresh with no degeneration change in quality.
Good ... Object wilted slightly.
Fair ... Object wilted in fact
Bad ... Object remarkably wilted.

Measurement of Rate of Temperature Change

After leaving the MAITAKE mushroom (packing object M) for 1 hour at 23° C. at a relative humidity of 50% RH, the temperature change inside each bag was measured.

As is apparent from the results shown in Table 2, dew concentration was caused at a negligible degree or in spots inside the bags used in the Subject Examples #1 to #11 described above (the evaluation of each sample was from "−" to "+"). The weight of dew condensation water in each of the Subject Examples was rated as "C". The wilting of packed object in each example was appraised as "Excellent". On the other hand, the bags in the Comparative Examples #6, #14 and #15 were rated as fine in the evaluation of dew condensation, but none of them was excellent in the evaluation of wilting. The bags in the Comparative Examples #1 to #5 and #7 to #13, which were rated "Excellent" in the evaluation of wilting, were "bad" in the evaluation of dew condensation.

As is apparent from the foregoing description, water evaporation from the packing object such as moist food packed inside the packing bag according to the present invention easily penetrates from inside the inner bag member formed of the inner film to the outside thereof, thus preventing dew condensation inside the packing bag.

The moisture evaporated from the packing object passes through the inner film of the inner bag member, but is hampered from penetrating the outer film. Consequently, the moisture inside the bag can be maintained moderately, thus preventing the object packed in the bag from wilting, shriveling up or being dried in excess.

Besides, the packing bag of the invention has the air layer between the inner bag member and the outer bag member, thus providing sufficient insulation effectiveness, so that the temperature inside the bag can be kept in some measure even if the air temperature outside the bag changes. As a result, the dew condensation inside the bag can be moderated.

Accordingly, the packing bag structure of the invention is highly effective in packing and storing moist articles such as easy-to-dry foods or perishable products as the moist articles can be prevented from being dried and wilted and kept in a non-soggy and untarnished state in the bag.

While the invention has been explained by reference to particular embodiments thereof, and while these embodiments have been described in considerable detail, the invention is not limited to the representative apparatus and methods described. Those of ordinary skill in the art will recognize various modifications which may be made to the embodiments described herein without departing from the scope of the invention. Accordingly, the scope of the invention is to be determined by the following claims.

What is claimed is:

1. A packing bag structure for Maitake mushroom, comprising an inner bag member made of an inner film of synthetic resin, and an outer bag member made of an outer film of synthetic resin and provided outside to cover said inner bag member, said inner film having moisture permeability of 9.2 to 186 g/(m$^2$·24 h), said outer film having moisture permeability of 5.3 to 9.2 g/(m$^2$·24 h), said inner and outer films having their end parts thermally welded together to form an air layer between said inner and outer bags and proportion in moisture permeability of 1.16 to 20.22.

2. The packing bag structure as claimed in claim 1 wherein at least one of the inner and outer films is coated on its inner surface with 0.1 to 5% by weight of anticlouding agent in aggregate.

* * * * *